US012583400B2

(12) United States Patent
Lamprecht et al.

(10) Patent No.: US 12,583,400 B2
(45) Date of Patent: Mar. 24, 2026

(54) SYSTEM AND METHOD FOR OPERATING A VEHICLE ACCESS POINT

(71) Applicant: Continental Autonomous Mobility US, LLC, Auburn Hills, MI (US)

(72) Inventors: Peter Lamprecht, Shelby Township, MI (US); Nizar Ahamed, Farmington Hills, MI (US)

(73) Assignee: AUMOVIO Autonomous Mobility US, LLC., Auburn Hills, MI (US)

( * ) Notice: Subject to any disclaimer, the term of this patent is extended or adjusted under 35 U.S.C. 154(b) by 0 days.

(21) Appl. No.: 18/855,102

(22) PCT Filed: Apr. 8, 2022

(86) PCT No.: PCT/US2022/071617
§ 371 (c)(1),
(2) Date: Oct. 8, 2024

(87) PCT Pub. No.: WO2023/196022
PCT Pub. Date: Oct. 12, 2023

(65) Prior Publication Data
US 2025/0256663 A1 Aug. 14, 2025

(51) Int. Cl.
B60R 11/04 (2006.01)
B60R 1/26 (2022.01)
(Continued)

(52) U.S. Cl.
CPC ............... B60R 11/04 (2013.01); B60R 1/26 (2022.01); G06V 20/58 (2022.01);
(Continued)

(58) Field of Classification Search
CPC ... B60R 11/04; B60R 1/26; B60R 2011/0082; B60R 2300/404; B60R 2300/8026;
(Continued)

(56) References Cited

U.S. PATENT DOCUMENTS

| | | | | |
|---|---|---|---|---|
| 4,660,649 | A | * | 4/1987 | Anderson ............ A01B 39/166 |
| | | | | 60/426 |
| 7,499,644 | B2 | * | 3/2009 | Franke ...................... B60R 1/23 |
| | | | | 348/148 |

(Continued)

FOREIGN PATENT DOCUMENTS

| | | |
|---|---|---|
| CN | 101008305 A | 8/2007 |
| CN | 113911035 A | 1/2022 |

OTHER PUBLICATIONS

International Search Report and Written Opinion dated Dec. 9, 2022 from corresponding International patent application No. PCT/US2022/071617.

*Primary Examiner* — James M Pontius

(57) ABSTRACT

A method of operating an access point to a vehicle includes moving a retractable sensor from a retracted position to an extended position. An area surrounding the retractable sensor is monitored for at least one object within the area surrounding the retractable sensor. The retractable sensor is moved from the extended position to the retracted position when the at least one object is no longer detected within a predetermined distance of the retractable sensor.

20 Claims, 2 Drawing Sheets

110 ⌐
```
A retractable sensor is moved from a retracted
position to an extended position.
```

120 ⌐
```
An area surrounding the retractable sensor is
monitored for at least one object.
```

130 ⌐
```
The retractable sensor is moved from the extended
position to the retracted position when the at least
one object is no longer detected within a
predetermined distance D of the retractable sensor.
```

(51) Int. Cl.
 *G06V 20/58* (2022.01)
 *B60R 11/00* (2006.01)

(52) U.S. Cl.
 CPC . *B60R 2011/0082* (2013.01); *B60R 2300/404*
 (2013.01); *B60R 2300/8026* (2013.01); *B60R*
 *2300/806* (2013.01); *B60R 2300/8093*
 (2013.01)

(58) Field of Classification Search
 CPC ...... B60R 2300/806; B60R 2300/8093; B60R
 2300/8033; B60R 2011/0047; B60R
 2011/004; B60R 2011/0085; B60R
 2011/0092; G06V 20/58
 See application file for complete search history.

(56) References Cited

U.S. PATENT DOCUMENTS

| | | | | |
|---|---|---|---|---|
| 9,068,390 | B2* | 6/2015 | Ihlenburg | E05F 15/40 |
| 12,267,630 | B1* | 4/2025 | Zhu | G01S 13/56 |
| 12,356,122 | B1* | 7/2025 | Risley | H04R 3/00 |
| 2001/0048280 | A1* | 12/2001 | Wilson | E05F 15/431 |
| | | | | 318/445 |
| 2006/0103727 | A1* | 5/2006 | Tseng | B60R 11/02 |
| | | | | 348/148 |
| 2010/0286875 | A1* | 11/2010 | Inoue | B62D 15/027 |
| | | | | 701/49 |
| 2014/0197649 | A1* | 7/2014 | Hansen | B60R 11/04 |
| | | | | 396/428 |
| 2015/0097953 | A1* | 4/2015 | Stambaugh | B60R 11/04 |
| | | | | 348/148 |
| 2015/0343949 | A1* | 12/2015 | Portier | B60R 11/04 |
| | | | | 348/148 |
| 2017/0163939 | A1* | 6/2017 | Thompson | B60R 11/04 |
| 2019/0048623 | A1* | 2/2019 | Ehrlich | E05B 85/107 |
| 2020/0331407 | A1* | 10/2020 | Cao | G01S 7/4813 |
| 2021/0060785 | A1* | 3/2021 | VanderSmitte | G06V 10/255 |
| 2021/0309162 | A1* | 10/2021 | Fimognari | H04N 23/51 |
| 2022/0032858 | A1* | 2/2022 | LaCross | H04N 23/50 |
| 2022/0146632 | A1* | 5/2022 | Laverne | G01S 17/931 |
| 2022/0212603 | A1* | 7/2022 | Castro | B60R 11/04 |
| 2023/0063296 | A1* | 3/2023 | Salter | B60P 7/04 |
| 2023/0211740 | A1* | 7/2023 | LaCross | B60R 1/12 |
| | | | | 348/148 |
| 2023/0331174 | A1* | 10/2023 | Bravo Corbacho | B60R 1/26 |
| 2023/0338969 | A1* | 10/2023 | Cheng | B03C 3/76 |
| 2023/0417090 | A1* | 12/2023 | Guerin | E05C 19/022 |
| 2024/0132057 | A1* | 4/2024 | Inoue | E05B 85/107 |
| 2024/0259665 | A1* | 8/2024 | Ravuri | H04N 23/57 |
| 2024/0336200 | A1* | 10/2024 | Baur | B60R 1/26 |
| 2024/0351541 | A1* | 10/2024 | Rosenthal | B60R 16/037 |
| 2024/0410216 | A1* | 12/2024 | Herman | E05F 15/43 |
| 2025/0074331 | A1* | 3/2025 | Shenoy | B60R 1/28 |
| 2025/0104469 | A1* | 3/2025 | Schwartz | G06V 20/58 |
| 2025/0267343 | A1* | 8/2025 | George | H04N 21/814 |
| 2025/0348078 | A1* | 11/2025 | Ritelli | B60L 58/12 |

* cited by examiner

SYSTEM AND METHOD FOR OPERATING A VEHICLE ACCESS POINT

BACKGROUND

The present disclosure relates to a system and method for operating a vehicle access point, for example, a handle with a sensor.

With advancements in vehicle safety, vehicles include an increasing number of sensors that monitor an area surrounding the vehicle. The sensors provide information to a vehicle operator that aide in maneuvering the vehicle while driving or parking. Occasionally, these sensors can become obstructed, by dirt or other objects, and fail to provide desired information. Therefore, some sensors are deployable when needed to protect them from the surrounding environment.

SUMMARY

In one exemplary embodiment, a method of operating an access point to a vehicle includes moving a retractable sensor from a retracted position to an extended position. An area surrounding the retractable sensor is monitored for at least one object within the area surrounding the retractable sensor. The retractable sensor is moved from the extended position to the retracted position when the at least one object is no longer detected within a predetermined distance of the retractable sensor.

In another embodiment according to any of the previous embodiments, the area surrounding the retractable sensor is monitored for the object includes utilizing at least one object detecting sensor to detect the object.

In another embodiment according to any of the previous embodiments, the at least one object detecting sensor includes at least one of a radar sensor, an ultrasonic sensor, or a lidar sensor and the at least one object is a person.

In another embodiment according to any of the previous embodiments, the at least one object detecting sensor includes at least one parking sensor.

In another embodiment according to any of the previous embodiments, the retractable sensor includes an optical camera. Monitoring the area surrounding the retractable sensor is performed by the retractable sensor.

In another embodiment according to any of the previous embodiments, moving the retractable sensor from the retracted position to the extended position occurs when a drivetrain of the vehicle is placed into reverse.

In another embodiment according to any of the previous embodiments, moving the retractable sensor from the extended position to the retracted position occurs after the drivetrain is moved out of reverse.

In another embodiment according to any of the previous embodiments, the retractable sensor is mounted immediately adjacent an access point to the vehicle. The access point includes a warning light.

In another embodiment according to any of the previous embodiments, the retractable sensor obtains a view from a rear of the vehicle.

In another exemplary embodiment, a rear-view sensor system for a vehicle includes a hardware processor. Hardware memory is in communication with the hardware processor. The hardware memory stores instructions that when executed on the hardware processor cause the hardware processor to perform operations including monitoring an area surrounding a retractable sensor for a person when a retractable sensor is in an extended position. The retractable sensor is moved from the extended position to a retracted position when an object is not detected within a predetermined distance of the retractable sensor.

In another embodiment according to any of the previous embodiments, the area surrounding the retractable sensor is monitored for a person includes utilizing at least one object detecting sensor to detect the object.

In another embodiment according to any of the previous embodiments, the at least one object detecting sensor includes at least one of a radar sensor, an ultrasonic sensor, or a lidar sensor and the object is a person.

In another embodiment according to any of the previous embodiments, the at least one object detecting sensor includes at least one parking sensor.

In another embodiment according to any of the previous embodiments, the retractable sensor includes an optical camera. Monitoring the area surrounding the retractable sensor is performed by the retractable sensor.

In another embodiment according to any of the previous embodiments, the retractable sensor is moved from the retracted position to the extended position when a drivetrain of the vehicle is placed into reverse.

In another embodiment according to any of the previous embodiments, the retractable sensor is mounted on a door release for the vehicle.

In another embodiment according to any of the previous embodiments, the door release is pivoted to move the retractable sensor between the retracted position and the extended position.

In another embodiment according to any of the previous embodiments, the retractable sensor is recessed into a body of the vehicle in the retracted position.

In another embodiment according to any of the previous embodiments, the retractable sensor is located at least partially outward of the body of the vehicle in the extended position.

In another embodiment according to any of the previous embodiments, the retractable sensor is located on a rear portion of the vehicle.

BRIEF DESCRIPTION OF THE DRAWINGS

The various features and advantages of the present disclosure will become apparent to those skilled in the art from the following detailed description. The drawings that accompany the detailed description can be briefly described as follows.

DESCRIPTION

In recent years, it has been increasing common for a vehicle to have a rear-view sensor, such as a rear-view optical sensor, that deploys only when the vehicle is in reverse. This protect the rear-view optical sensor from collecting debris that may interfere with gathering information. Also, a deployable sensor can simplify the exterior surface of a vehicle and prevent the sensor from engaging another object and becoming broken or separating from the vehicle. Also, deployable sensors can be incorporated into vehicle handles, such as truck, tailgate or hatch access handles, to gather information surrounding the rear of the vehicle.

Figure 1:
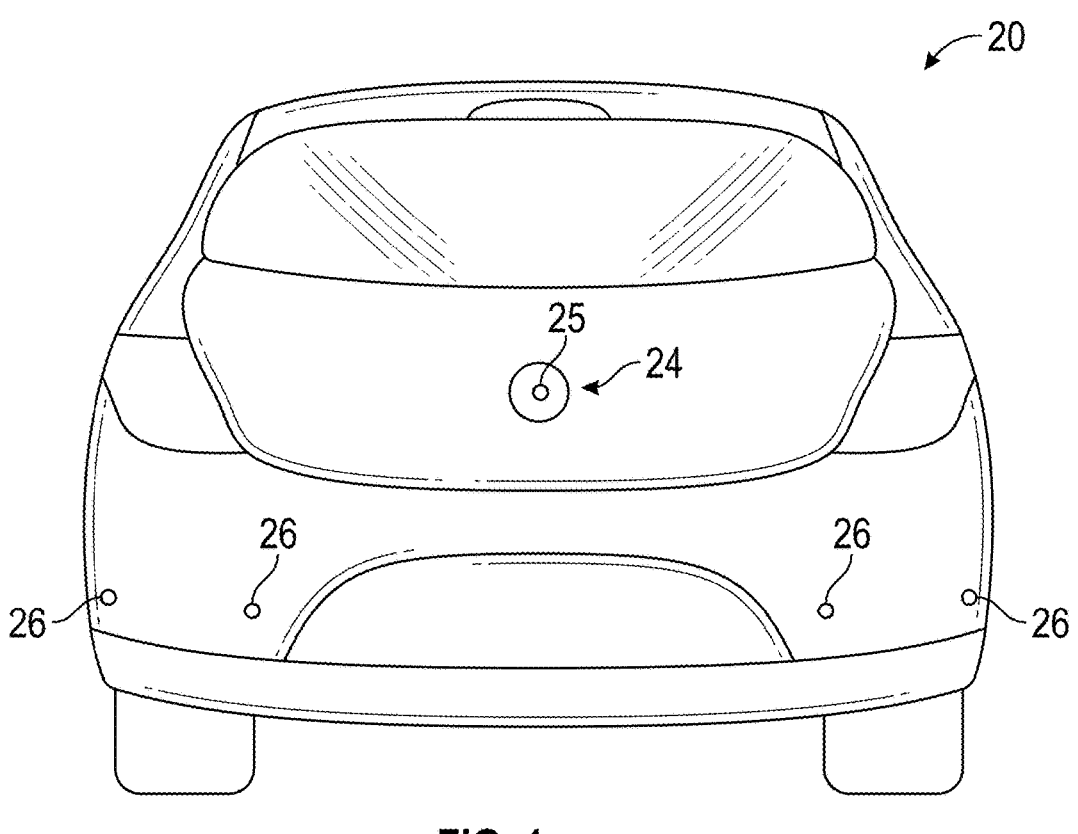
FIG. 1 schematically illustrates a vehicle having a rear-view sensor system.
Figure 2:
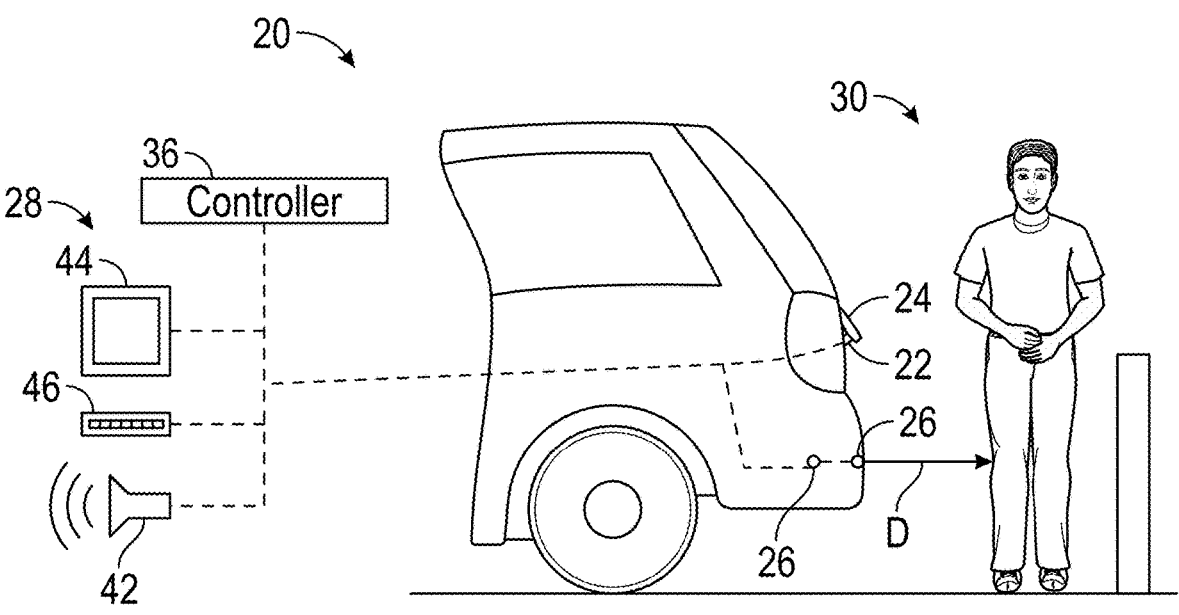
FIG. 2 schematically illustrates a side view of the vehicle of FIG. 1 positioned relative to an object.
Figure 3:
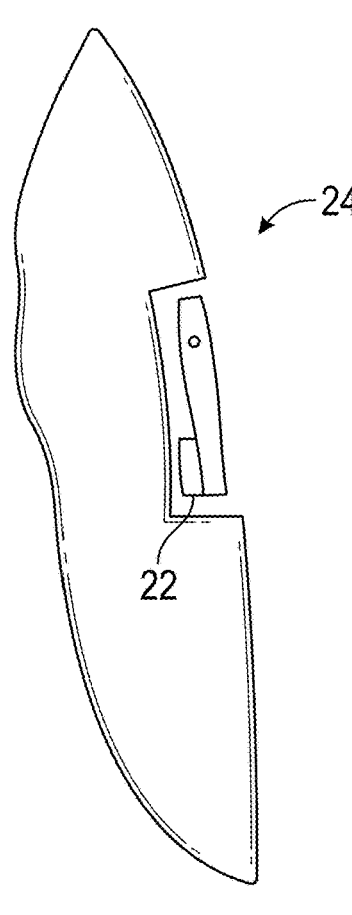
FIG. 3 illustrates a retractable sensor in a retracted position.
Figure 4:
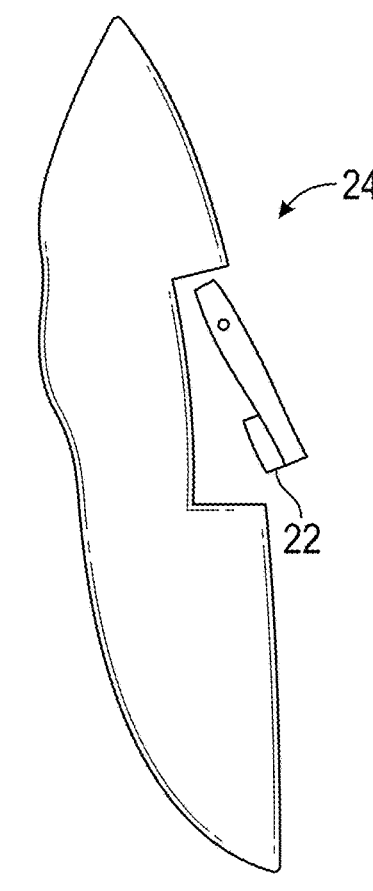
FIG. 4 illustrates the retractable sensor in an extended position.

FIGS. 1 and 2 illustrate an example vehicle 20 having a rear-view sensor system 40 with a retractable sensor 22 mounted on a handle 24 or access point into the vehicle 20. In the illustrated example, the handle 24 allows access into a rear of the vehicle 20, such as in a hatch or trunk of the vehicle 20. Alternatively, the handle 24 could provide access into a truck bed through a tailgate. With the retractable sensor 22 attached to the handle 24, the retractable sensor 22 moves between a retracted position recessed into a body portion of the vehicle 20 and an extended position extending from the body portion of the vehicle 20.

In one example, the retractable sensor 22 moves into the extended position when the vehicle 20 is placed in reverse and moves into the retracted position when the vehicle moves out of reverse. In the illustrated example, the retractable sensor 22 is a rear-view optical sensor or camera in electrical communication with a controller 36. However, the retractable sensor 22 could include at least one of an optical sensor, a radar sensor, an ultrasonic sensor, or a lidar sensor.

In addition to the retractable sensor 22, object detecting sensors 26 are located on a rear of the vehicle 20. The object detecting sensors 26 are in electrical communication with the controller 36 to detect when objects 30, such as a person 30A or pde 30B, are within a predetermined distance D (FIG. 2) of the rear of the vehicle 20. In one example, the object detecting sensors 26 include at least one of a radar sensor, an ultrasonic sensor, or a lidar sensor. Alternatively, the sensors 26 could be traditional parking sensors used when reversing or parking the vehicle 20. The parking sensors 26 can detect the proximity of the vehicle to an object 30, and provide an indicator 28 through at least one of an audible signal 42, a display 44, or a light array 46 in a passenger cabin of the vehicle 20 to alert the vehicle operator to the object 30.

Furthermore, the controller 36 can utilize the object detecting sensors 26 to determine the difference between a person or a stationary object, such as a pole. The controller 36 can then provide a different feedback to the operator of the vehicle 20 if the object 30 is a person or a stationary object. For example, the controller 36 can notify the operator that a person is within the predetermined distance D of the rear of the vehicle 20 and the operator can utilize that information when operating the vehicle 20. In one example, the predetermined distance is less than 5 feet (approximately 1.5 meters) and should be greater than the ability of a person to reach the handle 24. When the person is within the predetermined distance D, the controller 36 can maintain the retractable sensor 22 in the extended position until the person is no longer within the predetermined distance D of the rear of the vehicle 20 even though the vehicle 20 is no longer in reverse.

Figure 5:
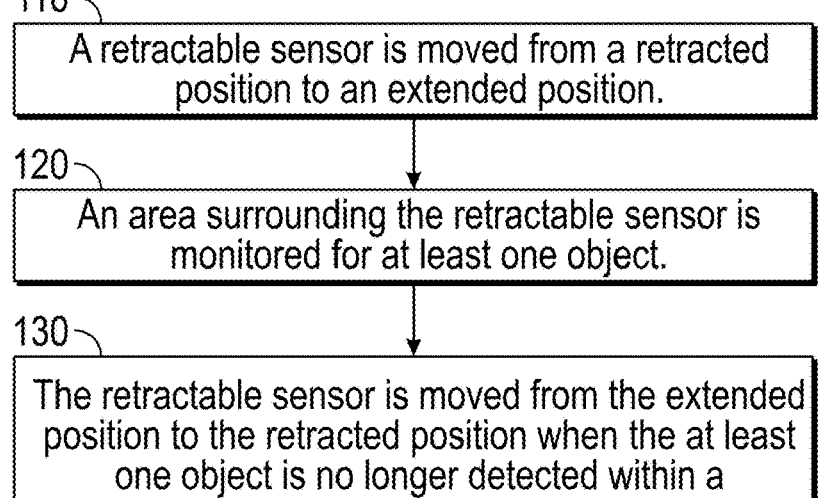
FIG. 5 illustrates a method of operating the rear-view sensor system.

As shown in FIG. 2, the rear-view sensor system 40 includes the controller 36, having a hardware processor and hardware memory in communication with the hardware processor. The hardware memory stores instructions that when executed on the hardware processor cause the hardware processor to perform operations described in the method 100 of operating the vehicle access point shown in FIG. 5. In particular, the controller 36 can move the handle 24 with the retractable sensor 22 between the retracted and the extended position to allow the retractable sensor 22 to other information. (Block 110).

When the retractable sensor 22 is in the extended position, the controller 36 can monitor an area surrounding the retractable sensor 22. (Block 120). The retractable sensor 22 can monitor a surrounding area to identify the object 30 when in the extended position. The controller 36 can use the retractable sensor 22 itself to monitor the surrounding area and determine if the object 30 is within a predetermined distance of the retractable sensor 22. In particular, if the controller 36 determines that the retractable sensor 22 is blocked, then the controller 36 can determine that the object 30 is within the predetermined distance D of the retractable sensor 22 and within the surrounding area. For example, if the retractable sensor 22 is an optical sensor and the image is fully blocked or blocked beyond a threshold percentage, such as 50%, then the controller 36 can determine that the object 30 is within the predetermined distance D of the retractable sensor 22.

Alternatively, the controller 36 can utilize at least one of the object detecting sensors 26 to monitor the area surrounding the rear of the vehicle 20 and determine if the object 30 is within the predetermined distance of the retractable sensor 22. The object detection sensors 26 can also be used to identify the difference between a person and a stationary object in addition to determining if the person or stationary object is within the predetermined distance D of the retractable sensor 22.

The controller 36 can move the retractable sensor 22 from the extended position to the retracted position when the object 30 is no longer within the predetermined distance D of the retractable sensor 22. (Block 130). Additionally, the controller 36 can keep the retractable sensor 22 is the extended position for as long as the vehicle 20 is in reverse regardless of the presence of the object or person within the predetermined distance of the retractable sensor 22. Alternatively, the controller 36 can determine if a person is contacting the retractable sensor 22 or the handle 24 and provide a visual warning, such as flashing hazard lights on the vehicle 20 or a warning light 25 on the handle 24. The controller 36 can also keep the retractable sensor 22 in the extended position when the vehicle 20 is no longer in reverse and the person or object 30 is within the predetermined distance of the retractable sensor 22.

Furthermore, if the controller 36 determines through the use of either the retractable sensor 22 or the object detection sensors 26 that the object 30 is not a person, the controller 36 can move the retractable sensor 22 to the retracted position even if the object 30 is still within the predetermined distance D of the retractable sensor 22. One feature of the controller 36 operating in this manner is to prevent a person within the predetermined distance of the retractable sensor 22 from interfering with the retracting motion of the handle 24.

In one example, the handle 24 pivots between the retracted position and the extended position relative to a body portion of the vehicle 20. This allows the retractable sensor 22 to be at least partially recessed into the body portion of the vehicle 20 when in the retracted position and at least partially extend outward from the body portion of the vehicle 20 when in the extended position.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of operating an access point to a vehicle, the method comprising;
   moving a retractable sensor from a retracted position to an extended position;
   monitoring an area surrounding the retractable sensor for at least one object within the area surrounding the retractable sensor; and
   moving the retractable sensor from the extended position to the retracted position when the at least one object is no longer detected within a predetermined distance of the retractable sensor.

2. The method of claim 1, wherein monitoring the area surrounding the retractable sensor for the object includes utilizing at least one object detecting sensor to detect the object.

3. The method of claim 2, wherein the at least one object detecting sensor includes at least one of a radar sensor, an ultrasonic sensor, or a lidar sensor and the at least one object is a person.

4. The method of claim 2, wherein the at least one object detecting sensor includes at least one parking sensor.

5. The method of claim 1, wherein the retractable sensor includes an optical camera and monitoring the area surrounding the retractable sensor is performed by the retractable sensor.

6. The method of claim 1, wherein moving the retractable sensor from the retracted position to the extended position occurs when a drivetrain of the vehicle is placed into reverse.

7. The method of claim 6, wherein moving the retractable sensor from the extended position to the retracted position occurs after the drivetrain is moved out of reverse.

8. The method of claim 1, wherein the retractable sensor is mounted immediately adjacent an access point to the vehicle and the access point includes a warning light.

9. The method of claim 1, wherein the retractable sensor obtains a view from a rear of the vehicle.

10. A rear-view sensor system for a vehicle, the system comprising:
   a hardware processor; and
   hardware memory in communication with the hardware processor, the hardware memory storing instructions that when executed on the hardware processor cause the hardware processor to perform operations comprising:
      monitoring an area surrounding a retractable sensor for a person when a retractable sensor is in an extended position; and
      moving the retractable sensor from the extended position to a retracted position when an object is not detected within a predetermined distance of the retractable sensor.

11. The system of claim 10, wherein monitoring the area surrounding the retractable sensor for a person includes utilizing at least one object detecting sensor to detect the object.

12. The system of claim 11, wherein the at least one object detecting sensor includes at least one of a radar sensor, an ultrasonic sensor, or a lidar sensor and the object is a person.

13. The system of claim 11, wherein the at least one object detecting sensor includes at least one parking sensor.

14. The system of claim 10, wherein the retractable sensor includes an optical camera and monitoring the area surrounding the retractable sensor is performed by the retractable sensor.

15. The system of claim 10, including moving the retractable sensor from the retracted position to the extended position when a drivetrain of the vehicle is placed into reverse.

16. The system of claim 10, wherein the retractable sensor is mounted on a door release for the vehicle.

17. The system of claim 16, including pivoting the door release to move the retractable sensor between the retracted position and the extended position.

18. The system of claim 16, wherein the retractable sensor is recessed into a body of the vehicle in the retracted position.

19. The system of claim 18, wherein the retractable sensor is located at least partially outward of the body of the vehicle in the extended position.

20. The system of claim 10, wherein the retractable sensor is located on a rear portion of the vehicle.

* * * * *